United States Patent [19]

Thibault et al.

[11] Patent Number: 4,556,612
[45] Date of Patent: Dec. 3, 1985

[54] RESEALABLE VENT VALVE FOR A RECHARGEABLE BATTERY

[75] Inventors: William C. Thibault, Melrose; Robert C. Fowler, Gainesville, both of Fla.

[73] Assignee: General Electric Company, Gainesville, Fla.

[21] Appl. No.: 678,525

[22] Filed: Dec. 5, 1984

[51] Int. Cl.$^4$ .............................................. H01M 2/12
[52] U.S. Cl. ......................................... 429/54; 429/82
[58] Field of Search ....................... 429/53, 54, 72, 82; 215/17, 18, 311; 220/366, 367, 373; 277/29; 55/309, 310, 385 C, 411, 412, 417

[56] References Cited

U.S. PATENT DOCUMENTS

| | | | |
|---|---|---|---|
| 3,293,081 | 12/1966 | Daley | 136/178 |
| 3,484,301 | 12/1969 | Gray | 136/178 |
| 3,664,878 | 5/1972 | Amthor | 136/178 |
| 4,131,722 | 12/1978 | Sugalski | 429/55 |
| 4,271,241 | 6/1981 | Hooke et al. | 429/54 |
| 4,298,662 | 11/1981 | Sugalski et al. | 429/54 X |
| 4,322,484 | 3/1982 | Sugalski | 429/94 |

Primary Examiner—Charles F. LeFevour
Attorney, Agent, or Firm—Henry J. Policinski

[57] ABSTRACT

A pressure relief valve is provided for venting gas from the interior of an electrochemical cell when the pressure of the gas within the cell is excessive. The valve effects sealing or the interior of the cell from the atmosphere when the pressure in the cell is not excessive. Within the relief valve first and second seals are disposed in series in a fluid path and serve not only to enhance the sealing function but also cooperate with resilient means to avoid substantial variations in valve opening pressure if the resilient means are misaligned during assembly of the valve.

14 Claims, 4 Drawing Figures

RESEALABLE VENT VALVE FOR A RECHARGEABLE BATTERY

BACKGROUND OF THE INVENTION

This invention relates to a new and novel resealable pressure relief vent valve for use in connection with rechargeable cells and batteries. More specifically, the present invention relates to a resealable pressure relief vent valve which, upon the build up of pressurized gas within the cell or battery container, opens to discharge a portion of the gas to atmosphere and thereby relieve or reduce the pressure of the gas remaining in the container.

The present invention is particularly useful in connection with rechargeable nickel-cadmium cells and batteries. Nickel-cadmium cells incorporating a starved or limited amount of electrolyte are commonly classified as sealed cells. A sealed cell during normal operation does not require a release of gas within the cell to atmosphere. Rather, the cell functions through repetitive charge and discharge cycles as a closed system without any release of gas to the atmosphere. Hence, the cell is said to be sealed during normal operation. However, when a nickel-cadmium cell is subjected to abuse or malfunction, hydrogen and/or oxygen gas may be generated in the cell and may result in the build-up of high and excessive gas pressure. In these circumstances, it is desirable to relieve the pressure of the gas within the cell by providing a resealable vent. The resealable vent opens at a predetermined pressure to connect the cell interior to the atmosphere thereby permitting the discharge of a portion of the gas to the atmosphere and then, after the gas discharge, reseals the cell interior from atmosphere thereby permitting the cell to function as a closed system. While such a cell is permitted to vent as heretofore described the cell, nonetheless, is commonly referred to as a sealed cell.

Starved electrolyte nickel-cadmium cells are provided with a limited amount of electrolyte in order to function properly. Venting of gas from a nickel-cadmium cell often reduces the amount of electrolyte remaining in the cell since small droplets of electrolyte may become entrained in the gas exiting the cell. While a nickel-cadmium cell may be vented on an infrequent basis without exhibiting a significant performance loss, venting of the nickel-cadmium cell on a repetitive frequent basis will result in excessive electrolyte removal and attendant cell dryout. Upon cell dryout the cell ceases to function adequately. Said another way, the vent valve mechanism should open only upon those infrequent occasions when the gas pressure within the cell is excessively high due to malfunction or abuse of the cell. Otherwise damage to the cell will occur Accordingly, it is important that a vent mechanism be designed to operate to vent gas from the cell only on infrequent occasions of excessive pressure and to effectively reseal the cell after the venting of gas to the atmosphere.

Vent mechanisms for nickel-cadmium cells generally may be set to open at pressures between 200 to 400 psi. The choice of the vent opening pressure depends upon the basic mechanical design of the cell with the opening pressure of the vent usually set such that pressure relief will occur through the vent before the pressure build-up is sufficient to rupture the cell. However, virtually all vented nickel-cadmium cells permit the build-up of some pressure less than the rupture pressure of the cell. Therefore, the vent mechanism for nickel-cadmium cells must, in addition to having the capability of relieving excessive gas pressure from the interior of the cell, have the capability of effectively sealing the interior of the cell from electrolyte leakage while the cell is pressurized at pressures below the rupture pressure. Since even pressures below the rupture pressure may be significant, the sealing integrity of the vent mechanism must be sufficient to provide an effective seal under conditions of substantial pressure.

Vent mechanisms for nickel-cadmium cells frequently are comprised of a number of component parts. During assembly of the component parts into a completed mechanism, the various component parts may become misaligned whereby the sealing force or the vent opening pressure will be different from the intended sealing force and vent opening pressure found in vent mechanisms with properly aligned parts. In high volume production lines, the rapidity at which the vent mechanisms must be assembled increases the probability of misalignment of component parts and increases the probability of the presence of sealing forces and vent opening pressures at variance from intended sealing forces and vent opening pressures. This variance may result in a vent mechanism which permits venting of gas from the cell at a pressure less than that intended. Accordingly, the cell will vent more frequently than necessary and premature dry out of the electrolyte within the cell will occur. The variance may also result in a sealing force which is not sufficient to keep electrolyte from leaking from the cell under certain conditions when there is a substantial pressure within the cell container. Even though relatively little or no pressure may exist in the cell, nickel-cadmium cells are susceptible to a phenomenon commonly known as creep leakage which involves leakage of the electrolyte from the cell when the cell is inadvertently externally shorted. The present inventions provide a vent mechanism adapted to overcome all of the aforementioned problems.

It is therefore an object of the present invention to provide a resealable pressure relief vent valve for use in a rechargeable nickel-cadmium cell.

It is another object of the present invention to provide a resealable pressure relief vent valve which will relieve excessively high gas pressure within the rechargeable cell.

It is still another object of the present invention to provide a resealable pressure relief vent valve which will open only upon the infrequent occasions where the gas pressure within the cell is excessively high due to abuse or malfunctioning of the cell.

It is yet another object of the present invention to provide a resealable pressure relief vent valve which, after relieving the gas pressure within the cell, will reseal the interior of the cell from the atmosphere.

It is still yet another object of the present invention to provide a resealable pressure relief vent valve, for providing an effective seal against leakage of electrolyte from the cell, comprised of component parts which may be assembled at highly rapid rates without resulting in variances from required or intended sealing forces or vent opening pressures.

SUMMARY OF THE INVENTION

Briefly stated, these and other objects of the present invention, which will become apparent from the following detailed description and accompanying drawings, are accomplished by the present invention which, in one form, provides a resealable pressure relief valve for venting to atmosphere at least a portion of the gas from the interior of the cell when the gas pressure in the cell is excessively high and for sealing the cell interior from the atmosphere after the relief of excessive pressure. The valve is comprised of an outer cover plate and a generally circular inner base plate joined to the outer cover to form a central cavity therebetween. The inner base plate includes a wall bounding a portion of the cavity and spaced from the outer cover plate. An orifice is provided in the wall communicating the cell interior with the cavity. The wall further contains a first protuberance entirely surrounding the orifice to provide a first sealing seat entirely surrounding the orifice. The wall further includes a second protuberance entirely surrounding the first protuberance to provide a second sealing seat entirely surrounding the first sealing seat. Elastomeric sealing means are disposed within the cavity adjacent the wall portion and has a sealing face in abutting engagement with the first and second sealing seats to form first and second annular seals respectively. Resilient means are disposed within the cavity between the cover plate and the elastomeric sealing member for biasing the elastomeric sealing member into sealing engagement with the first and second sealing seats to effect the first and second seals, respectively. Accordingly, first and second annular concentric seals are provided for sealing the interior of the cell from atmosphere. Another feature of the present invention provides for engagement of the resilient means with the elastomeric member at a location between the two concentric seals whereby misalignment of the resilient means during assembly will not result in any substantial variance from the intended sealing force.

BRIEF DESCRIPTION OF THE DRAWINGS

While the specification concludes with claims particularly pointing out and distinctly claiming the present invention, the invention will be more readily understood from the following description of the preferred embodiment which is given by way of example with the accompanying drawings in which:

DESCRIPTION OF THE PREFERRED EMBODIMENT

Figure 1:
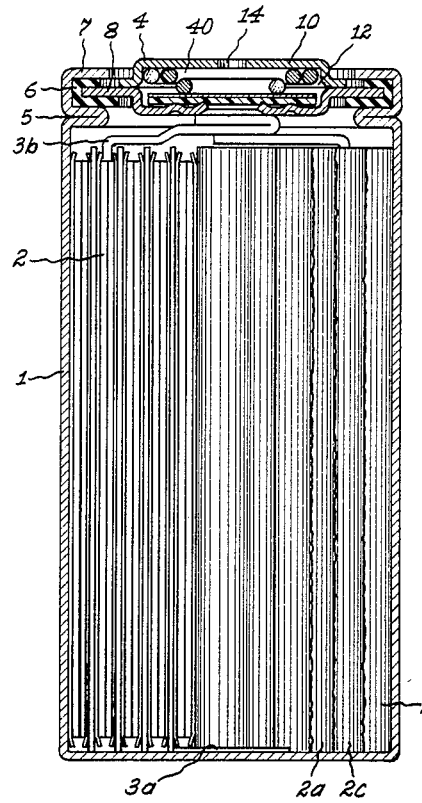
FIG. 1 is a fragmentary cross-sectional view of the resealable vent valve of the present invention disposed in a rechargeable electrochemical cell with the valve in a closed rather than open position.

Referring now to FIG. 1, there is depicted a fragmentary cross-sectional view of a rechargeable electrochemical cell containing the vent valve of the present invention. The electrochemical cell is comprised of a nickel-plated steel can or casing 1 in which is contained a battery electrode assembly 2 which is, in turn, comprised of a positive electrode 2a and a negative electrode 2b separated from each other by separator insulative layers 2c. The electrodes 2a and 2b and separated layers 2c are all wound together in spiral form to comprise battery electrode assembly 2. A negative current collector 3a, connected to or integral with the negative electrode 2b, is in electrical contact with casing 1. Another current collector 3b connected to or integral with the positive electrode 2a is electrically connected to resealable vent valve 4 whereby the exterior of the vent valve 4 may serve as one of the terminals used to discharge and charge the electrochemical cell. The cell container includes an electrolyte residing in the electrodes 2a and 2b and in the separator layers 2c.

The upper end of the electrochemical cell may be provided with a circumferentially extending groove 5 and a circumferentially extending lip 7 spaced axially from groove 5 whereby an annular seal ring 6 may be placed in the axial space between the groove 5 and lip 7. During manufacture the upper end of the cell may be subjected to a deformation step whereby lip 7 is axially displaced and the upper end of the cell is radially displaced to effect a fluid tight seal between casing 1 and seal 6. Seal 6 is also adapted to engage the outer circumferential edge of an inner base plate 8 of vent valve 4. The aforementioned radial and axial displacement is effective to also provide a fluid tight seal between the circumferential edge of inner base plate 8 and seal 6.

In addition to inner base plate 8, vent valve 4 is comprised of an outer cover plate 10 spaced in part from, and cooperating with, inner base plate 8 to form a cavity 12 therebetween. Outer cover plate 10 is provided with a central opening 14 communicating the cavity 12 with the atmosphere exterior to the electrochemical cell.

Figure 3:
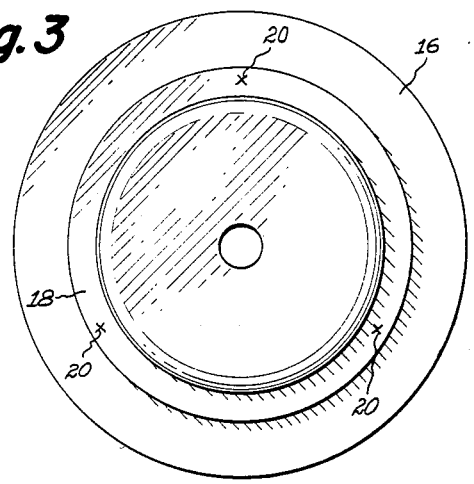
FIG. 3 is an enlarged top view of the vent valve comprising the present invention.
Figure 2:
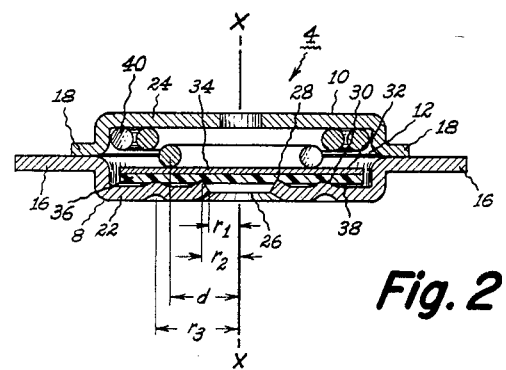
FIG. 2 is an enlarged cross-sectional view of the vent valve comprising the present invention.
Figure 4:
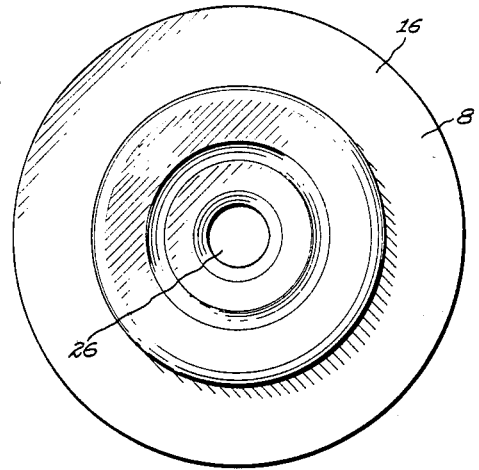
FIG. 4 is an enlarged bottom view of the vent valve comprising the present invention.

Referring now to FIGS. 2 through 4, inner base plate 8 and outer cover plate 10 are each comprised of a configuration generally circular about an axis x—x. Plates 8 and 10 have outer circumferentially extending edge portions 16 and 18 respectively. Edge portions 16 and 18 are welded to each other at a plurality of locations 20 whereby cover plate 10 is securely and immovable affixed to base plate 8 to form a rigid structure for containing the interior components of vent valve 4.

Plates 8 and 10 are provided with centrally located radially and circumferentially extending wall portions 22 and 24, respectively, spaced apart from each other and bounding a portion of cavity 12. Accordingly, wall portions 22 and 24 are axially displaced from each other along the x—x axis and disposed in facing confronting relationship with respect to each other to form cavity 12 therebetween.

Wall portion 22 of inner base plate 8 is provided with a centrally located vent orifice 26, having a first radius $r_1$ from the x—x axis, for selectively communicating the interior of the electrochemical cell with cavity 12 and hence with the atmosphere exterior to the cell. Wall portion 22 is further provided with a first annular ring 28 protruding axially toward wall portion 24 and having a second radius $r_2$ (from axis x—x) greater than the radius $r_1$, of orifice 26. First annular ring 28 entirely surrounds vent orifice 26 and, accordingly, provides a first annular sealing seat entirely surrounding vent orifice 26. A second annular ring 30, protruding axially toward wall portion 24, is also provided in wall portion 22 and is disposed at a third radius $r_3$ (from axis x—x) which is greater than the radius $r_2$ of first annular ring 28. Second annular ring 30 entirely surrounds first annular ring 28 to provide a second annular sealing seat entirely surrounding the first annular ring 28 and the vent orifice 26.

Disposed within cavity 12, a generally circular flat disc-like elastomeric sealing member 32 is comprised of a generally thin circular metallic backing plate 34 to which is bonded a layer of elastically deformable material 36 having a sealing face 38. Elastomeric sealing member 32 is arranged in cavity 12 adjacent wall portion 22 to effect abutting sealing engagement of sealing face 30 with each of the annular rings 28 and 30 to form first and second annular seals respectively.

Vent valve 4 further includes resilient means in the form of conical spring 40 disposed in cavity 12 and compressed between wall portion 24 and sealing member 32. Spring 40 includes a first large coil diameter end in engagement with cover plate 10 and a second small coil diameter end in engagement with backing plate 34 of sealing member 32. In accordance with one feature of the present invention, spring 40 engages sealing member 32 at a location spaced radially from axis x—x by a distance d which is less than radius $r_3$ and greater than the radius $r_2$. Accordingly spring 40 engages sealing member 32 at a radial location disposed radially between annular sealing ring or seat 28 and annular sealing ring or seat 30. Spring 40 exerts a biasing force on seal member 32 for biasing seal member 32 into the aforementioned abutting sealing engagement with sealing rings or seats 28 and 30.

It is apparent from the foregoing description that a fluid path is provided for selectively communicating the interior of the electrochemical cell with cavity 12. This fluid path extends axially through orifice 26 and then radially outwardly between wall portion 22 and sealing member 32 and past annular rings or seals 28 and 30. With the vent valve 4 in the closed position as viewed in FIG. 1, seal member 32 is shown in a first position in abutting sealing engagement with each of the annular sealing rings or seats 28 and 30 which respectively effect first and second fluid tight seals each obstructing the passage of fluid radially through the fluid path between seal member 32 and wall portion 22. Upon the build-up of excessive pressure within the interior of the electrochemical cell, the pressure acting across the area circumscribed by the first annular sealing seat 28 produces a force on seal member 32 which acts in a direction opposite to the biasing force exerted by spring 40 on seal member 32. When the force produced by the gas pressure acting over the area circumscribed by seal 28 becomes greater than the biasing force of spring 40 holding the vent closed, the seal member 32 is moveable to a second position disengaged from sealing seats 28 and 30 thereby permitting the flow of fluid past the seats 28 and 30 through the aforedescribed fluid path. In this manner then gas under excessive pressure within the interior of the cell is vented through the fluid path to cavity 12 and thence through opening 14 in cover plate 10 to atmosphere. When the pressure has been relieved, the biasing force of spring 40 closes vent valve 4 by closing the engagement of seal meter 32 with sealing seats 28 and 30 to again obstruct the flow of fluid through the fluid path.

It is readily observed that the present invention provides two annular seals arranged in series in a fluid flow path. The annular seals are comprised of a pair of radially spaced apart annular seal rings or seats 28 and 30 and a single seal element 32 in engagement with both seats 28 and 30. Use of a single seal element 32 to effect a double seal results in a pressure relief vent of reduced complexity and cost. Furthermore, the present invention provides seats 28 and 30 which protrude from wall portion 22 to create localized areas of high compression of the elastomeric material 36 sandwiched between the seats 28, 30 and the backing plate 34 of seal member 32.

It has been found to be advantageous to construct seal rings 28 and 30 such that inner seal ring 28 protrudes from planar surface of wall 22 by a greater distance than the protrusion of outer seal ring 30. Therefore material 36 is compressed more at seat 28 than at seat 30. The areas of high localized compression at each of seats 28 and 30 create higher sealing forces and result in first and second seals particularly well adapted to prevent leakage of electrolyte from the cell under pressure conditions less than the pressure required to open the vent. Accordingly, the present invention provides a significant advantage over vent valves which effect sealing engagement over an uninterrupted surface not having any protrusions.

In accordance with another feature of the present invention, elastomeric material 36 may be selected from a variety of materials such as ethylene propylene diene monomer. Since these materials are not entirely pore-free, even a slight degree of porosity may result in the leakage of electrolyte through the elastomeric material 36. The degree of leakage tends to be greater for greater cross-sectional thicknesses of material 36 perpendicular to the direction of fluid flow. It has been discovered that, with elastomeric material comprised of ethylene propylene diene monomer, the cross-sectional thickness of the material must be equal to or less than approximately 0.020 inches in order to virtually eliminate creep leakage of electrolyte.

As stated above, the spring 40 engages sealing member 32 at a location radially spaced from the x—x axis by a radial distance d which is less than the radius $r_3$ and greater than the radius $r_2$. Said another way, spring 40 engages sealing member 32 at a radial location between annular sealing ring or seat 28 and annular sealing ring or seat 30. With spring 40 contacting seal member 32 in this manner, misalignment of spring 40 within cavity 12 during assembly of vent valve 4 will not result in any substantial variance of the opening pressure of vent valve 4. Substantial variance is avoided since the misaligned spring would still apply its biasing force at a distance from the axis x—x which is less than the distance $r_3$. Accordingly, misalignment does not cause the sealing member 32 to tip about the annular sealing ring or seat 30. On the other hand, if the spring 40 were to apply its biasing force to seal member 32 at a location from the x—x axis greater than the distance $r_3$ (that is outside the annular ring 30), misalignment of spring 40 with respect to the x—x axis would create unequal lever arms from the biasing force to the ring 30 at opposite sides of ring 30. This, in turn, would create a force unbalance tending to tip the seal member about a fulcrum comprised of a portion of ring 30. The force imbalance may easily result in a substantial variance of the opening pressure of the vent valve 4. The present invention avoids this undesirable result by providing for engagement of spring 40 with seal member 32 at a distance d less than the radius $r_3$ of the ring 30.

As is observed from the foregoing description the present invention provides for a pair of concentric seals in series in a fluid path. The provision of two seals in series enhances the ability of the vent valve 4 to inhibit the leakage of electrolyte from the interior of the cell. As heretofore explained, this sealing function is accomplished with a minimum of component parts and expense. In addition to enhanced sealing capability, the provision of two concentric seals disposed in series in a fluid path in the manner described above permits another advantage to be realized. This benefit will now be explained. Since the structural integrity of the cell container is typically quite good, substantial high pressure may exist in the container without bursting the container and the opening pressure may, therefore, be set quite high. However, the space available in which the vent valve 4 may reside in the electrochemical cells is quite limited and therefore the vent valves 4 must be quite small. Furthermore, the area circumscribed by the vent circumscribed by the vent valve seal must be sufficiently small so that the force created by the pressure acting on the circumscribed area will not exceed the spring force and will not cause premature opening of the vent. The limited space available for the vent and the relationship between the spring force and the seal area subject to the interior cell pressure virtually compels that the diameter of the area circumscribed by ring 28. Given this relationship, if only ring 28 were provided, misalignment of spring 40 would cause the member 32 to tip about the ring 28 and cause a substantial variance from the intended opening pressure. Provision of second annular ring or seat 30, not only introduces a second seal in the fluid path but also eliminates tipping of seal member 32 about the seal ring 28. As described above, elimination of tipping is achieved since the addition of ring 30 assures that the spring force will be applied at a location from the axis x—x less than the radius $r_3$ of ring 30.

It is desirable to appreciate another aspect of the present invention. As may be observed from FIG. 2 the axial distance of wall 24 from wall 22 is established such that coil spring 40, when residing in cavity 12, is compressed to a degree that at least one coil is nested or disposed in the same plane as an adjacent coil. Furthermore, spring 40 is constructed so that the outer diameter of any given coil of the spring 40 is slightly less than the inner diameter of the adjacent cost of the spring 40. Accordingly, with spring 40 compressed to the degree that one coil is nested within an adjacent coil, better alignment of the one end of the coil spring 40 with its other end is achieved.

While the preferred embodiment of the present invention has been described as depicted, it will be appreciated by those skilled in the art that modifications, substitutions and changes may be made thereto without departing from the scope of the invention as set forth in the appended claims.

We claim:

1. A resealable pressure relief valve for venting to atmosphere at least a portion of the gas from the interior of a rechargeable electrochemical cell when the pressure of said gas in said cell is excessively high and for sealing said interior from said atmosphere when said pressure is not excessively high, said relief valve comprising:
   an outer cover plate;
   an inner base plate spaced from said cover plate to form a central cavity therebetween communicating with said atmosphere, said inner base plate having an orifice therethrough and further having a first sealing seat entirely surrounding said orifice and a second sealing seat entirely surrounding said first sealing seat;
   a fluid path communicating said cell interior with said cavity and said atmosphere, said path extending through said orifice past said first and second sealing seats and through said cavity and said cover plate;
   a seal member disposed within said cavity adjacent said inner base plate, said seal member moveable from a first position in abutting sealing engagement with each of said sealing seats to respectively effect first and second seals each obstructing the passage of fluid through said fluid path to a second position spaced from each of said sealing seats to permit the passage of said gas through said fluid path and past said first and second sealing seats; and
   resilient means disposed within said cavity for biasing said seal member into said abutting sealing engagement with each of said first and second sealing seats.

2. The invention as set forth in claim 1 wherein said resilient means engages and applies a biasing force to said sealing member at a radial location disposed between said first and second sealing seats.

3. The invention as set forth in claim 2 wherein said resilient means is comprised of a spring having first and second ends, said first end engaging said cover plate and said second end engaging said seal member at a location between said first and second sealing seats, said spring being compressed between said cover plate and said sealing member.

4. The invention as set forth in claim 3 wherein said inner base plate is spaced apart from said outer cover plate by a preselected distance whereby said spring is compressed between said cover plate and said sealing member sufficiently to cause adjacent coils of said spring to be disposed in the same radial plane.

5. The invention as set forth in claim 1 wherein said first and second sealing seats protrude from said inner base plate and whereby abutting sealing engagement of said seal member with each of said seats effects localized compression of said seal member.

6. The invention as set forth in claim 5 wherein said localized compression of said seal member at said first seat is greater than the localized compression of said seal member at said second seat.

7. A resealable pressure relief valve for venting to atmosphere at least a portion of the gas from the interior of a rechargeable electrochemical cell when the pressure of said gas in said cell is excessively high and for resealing said interior from said atmosphere after said venting, said relief valve comprising:
   an outer cover plate;
   a generally circular relatively thin walled inner base plate joined to the outer cover plate to form a central cavity therebetween communicating with said atmosphere, said inner base plate having a wall portion bounding a portion of said cavity and spaced from said outer cover plate, said wall portion having a vent orifice having a first radius from a central axis, said orifice communicating said cell interior with said cavity and said atmosphere, said wall portion including a first annular axially protruding ring having a second radius from said axis greater than said first radius of said orifice, said first ring protruding toward said cover portion and entirely surrounding said vent orifice and forming a first annular sealing seat entirely surrounding said orifice, said wall portion further having a second annular axially protruding ring having a third radius from said axis greater than said second radius, said second ring protruding toward said cover portion and entirely surrounding said first annular ring and forming a second annular sealing seat entirely surrounding said first sealing seat;

an elastomeric sealing member disposed within said cavity adjacent said wall portion and having a sealing face in abutting engagement with said first and second annular sealing seats to form first and second annular seals respectively; and resilient means disposed within said cavity between said outer cover plate and said elastomeric sealing member, said resilient means biasing said elastomeric sealing member to a first position in sealing engagement with said first and second sealing seats to effect said first and second seals respectively to isolate said cell interior from communication with said cavity and said atmosphere, said elastomeric member being moveable in response to pressure within said cell interior from said first position to a second position permitting the passage of said gas past said first and second sealing seats.

8. The invention as set forth in claim 7 wherein said resilient means applies a biasing force to said elastomeric member at a location radially spaced from said axis by a distance which is greater than said second radius but less than said third radius.

9. The invention as set forth in claim 8 wherein said resilient means is comprised of a coiled spring having first and second ends, said first end engaging said cover plate, said second end engaging said elastomeric member at said location.

10. The invention a set forth in claim 7 wherein said elastomeric sealing member is comprised of a relatively thin backing plate to which is bonded a layer of elastically deformable material, said backing plate facing said outer cover plate and in engagement withsaid resilient means, said layer facing said wall portion and carrying said sealing face engaging said first and second sealing seats.

11. The invention as set forth in claim 10 wherein the protrusion from said wall portion of said first annular protruding ring is greater than the protrusion from said wall portion of said second annular protruding ring.

12. The invention as set forth in claim 10 wherein said elastically deformable material is comprised of a thickness of approximately 0.020 inches.

13. The invention as set forth in claim 12 wherein said elastically deformable material is comprised of ethylene propylene diene monomer.

14. A rechargeable electrochemical cell including resealable pressure relief valve for venting to atmosphere at least a portion of the gas from the interior of a rechargeable electrochemical cell when the pressure of said gas in said cell is excessively high and for sealing said interior from said atmosphere when said pressure is not excessively high, said cell comprising:

a cylindrical cell casing;

an electrode assembly disposed within said cell casing;

an electrolyte residing in said electrode assembly;

an outer cover plate disposed at one end of said cell casing;

an inner base plate spaced from said cover plate to form a central cavity therebetween communicatting with said atmosphere, said inner base plate having an orifice therethrough and further having a first sealing seat entirely surrounding said orifice and a second sealing seat entirely surrounding said first sealing seat;

a fluid path communicating said cell interior with said cavity and said atmosphere, said path extending through said orifice past said first and second sealing seats and through said cavity and said cover plate;

a seal member disposed within said cavity adjacent said inner base plate, said seal member moveable from a first position in abutting sealing engagement with each of said sealing seats to respectively effect first and second seals each obstructing the passage of fluid through said fluid path to a second position spaced from each of said sealing seats to permitting the passage of said gas through said fluid path and past said first and second sealing seats; and resilient means disposed within said cavity for biasing said seal member into said abutting sealing engagement with each of said first and second sealing seats.

* * * * *